United States Patent [19]
Marino

[11] Patent Number: 5,586,487
[45] Date of Patent: Dec. 24, 1996

[54] PASTA PERCOLATOR

[76] Inventor: Francis E. Marino, 9 Hazeltine Rd., Upton, Mass. 01568

[21] Appl. No.: 446,249

[22] Filed: May 22, 1995

[51] Int. Cl.$^6$ .............................. A47J 27/04; A47J 27/06; A47J 27/18; A47J 27/21
[52] U.S. Cl. .................. 99/330; 99/331; 99/346; 99/403; 99/407; 99/415; 99/418
[58] Field of Search .............................. 99/330–333, 300, 99/302 R, 304–315, 342, 345–347, 357, 403, 407, 409–418; 126/369, 369.1, 373, 374

[56] References Cited

U.S. PATENT DOCUMENTS

| | | | |
|---|---|---|---|
| 3,024,718 | 3/1962 | Morrison | 99/289 |
| 3,053,166 | 9/1962 | Ashley | 99/346 |
| 3,450,024 | 6/1969 | Martin | 99/295 |
| 3,958,502 | 5/1976 | Vitous | 99/300 |
| 4,060,026 | 11/1977 | Lohr et al. | 99/346 |
| 4,066,010 | 1/1978 | Larsson | 99/346 |
| 4,718,331 | 1/1988 | Ansaloni et al. | 99/403 |
| 4,732,080 | 3/1988 | Vita | 99/407 |
| 4,803,916 | 2/1989 | Tacconi | 99/330 |
| 4,803,917 | 2/1989 | Barbieri | 99/410 |
| 4,869,160 | 9/1989 | Pratolongo | 99/330 |
| 5,142,966 | 9/1992 | Morandi et al. | 99/331 |
| 5,191,829 | 3/1993 | Caffarella | 99/403 |

*Primary Examiner*—Timothy F. Simone
*Attorney, Agent, or Firm*—Francis E. Marino

[57] ABSTRACT

A device and method for automatically cooking and draining pasta is provided in which water contained in a first compartment is heated to percolate through a conduit disposed between the first compartment and a second compartment, to the second compartment which contains the pasta, the pasta is cooked in the heated water, and then the water flows from pasta, thereby draining it, into the first or a third compartment.

17 Claims, 18 Drawing Sheets

5,586,487

PASTA PERCOLATOR

FIELD OF THE INVENTION

The present invention is related to the cooking of pasta, rice, noodles, and such more specifically, the invention is related to a device and method for automatically cooking such in absentment and at a preselected time.

BACKGROUND OF THE INVENTION

The cooking of pasta, rice, noodles and such is a practice that dates back many years. Pasta and noodles are generally boiled in water. Rice is generally boiled or steamed. The starchy properties of these foods requires that they be combined with the cooking water at the time of cooking, and not long before. Otherwise, the foods will absorb the water, become soft and sticky, clump together, and will not properly cook.

Rice to be boiled is usually placed into a pot of water and then brought to a boil over a heat source. After a period of boiling, the rice must be drained of the water to prevent overcooking and clumping. The cooked rice must thereafter be kept warm and moist until eaten to preserve the flavor and texture obtained from such cooking.

Proper preparation of pasta and noodles requires that the water be pre-boiled before the food is added. After a period of further boiling, the food is drained of the water and kept warm and moist for those same reasons mentioned.

People, having various individual preferences, may desire that the foods be softer and more thoroughly cooked, or firmer and less thoroughly cooked. This may be controlled by the boiling time, cooking pressure, or cooking temperature.

As can be assumed from the cooking method, the cooking of such starchy foods is an involved process which to-date has required the direct attention of the preparer to avoid improper results.

SUMMARY AND OBJECTS OF THE INVENTION

The present invention is a device and method for preparing such starchy foods as pasta, noodles, and boiled rice, which allows the user to preload the device with the uncooked foods and water, initiate a cooking cycle or select a time for such initiation and cooking, and which then boils the water, combines the boiling water with the foods to cook the foods, drains the water from the cooked foods.

The invention is realized through adaptation of technology proven functional and effective in brewing ground coffee, to the specialized processes of cooking pasta, noodles, and boiled rice. The long felt need for such a convenient method of automatic pasta cooking is evidenced by the popularity of pasta, pasta making machines, and other automatic food preparation machines such as rice steamers, bread makers, and coffee brewers, all equipped with timers and systems to prepare the consumables in absentment. The recent trends of society, in which many households have become "two income" households, has left little spare time in such households for such tedious cooking practices. Further, it is very popular these days to select meals which are instantly ready, such as "fast foods", or quick to prepare, since the custom of having housewives home to prepare meals is no longer so common. Appliances with timing means, such as automatic coffee-brewers, which can be preloaded and preset to prepare consumables at a preselected time are very convenient to such busy households. The market acceptance of such devices in recent years attests to their value to the consuming public. In spite of such a open marketplace for such a device, not a single automatic pasta cooking appliance or method known to the inventor has allowed for such prearrangement of or automatic performance of the complicated cooking of such foods.

The present invention includes cooking means including a heat supply for heating water, a first adjustable timing means to select a cooking initiation time, a second adjustable timing means to select and control a cooking period, and an adjustable cooking intensity control to control the cooking temperature. The device further includes water retaining means in heat communication with the cooking means, and food retaining means which may be removed from the device for loading the uncooked food thereinto and for serving the cooked food therefrom, for rinsing the cooked food therethrough, and for washing by rinsing or within a dish-washing machine.

One embodiment of the device further includes a main housing which fully encloses the water retaining and food retaining means, and which includes sealing means to accurately maintain pressure during the cooking process and to maintain heat and moisture thereafter. The sealing means further comprise a cover having a certain weight and area resting on and sealing the main housing to thereby regulate a consistent pressure therein during cooking, with the resulting pressurized environment including the water retaining means to increase boiling temperature and the food retaining means to accelerate heat penetration into the foods. The food retaining means and water retaining means communicate through a vertical conduit. The boiled water flows from the water retaining means to the food retaining means and showers over the food for cooking thereof. Meanwhile, the water continuously returns to the water retaining means for reheating during cooking. After cooking, the foods are drained and then maintained in a warm and moist environment, without further cooking and ready to be consumed. The water retaining means is easily washable to remove starchy residues after cooking, although it is found that the continuous showering negates the need for such.

In another embodiment, a second water retaining means is provided, into which the draining water flows during and after cooking. This second water retaining means is removable and easily washable.

Initially, the user loads water into the water retaining means and food such as pasta into the food retaining means. The cooking process may be initiated instantly by the user, or at a later time as selected by the user through the first adjustable timing means. Immediately after the initiation of the cooking process, water within the water retaining means is heated and forced, by heat percolation, upwards and over the food within the food retaining means at a given flow rate. This heated water collects within the food retaining means to cook the food therein. In the first embodiment, the food retaining means includes drainage holes to allow that collected water to return to the water retaining means at a rate slower than the given rate so that the food becomes immersed in the heated water during cooking but is drained when cooking is completed. That water draining back to the water retaining means during cooking is further heated to increase the cooking temperature continuously until the second timing means terminates the cooking process. After cooking, heat of the cooking means is reduced or terminated to stop the upward flow of heated water, but a lesser heat or the residual heat from the previously heated water provides a warmth and moisture which maintains the cooked food in a favorable condition for eating.

In another embodiment the collected water in the food retaining means drains to a second water retaining means at a rate slower than the given rate so that the food becomes immersed in the heated water during cooking but is drained when cooking is completed.

It is found that the showering of heated water over the foods provides faster cooking while eliminating the need for stirring and post rinsing of the pasta. It is found that the pressurized cooking provides faster cooking and a more even consistency to the cooked food.

It is the object of the invention to provide means by which a user may initiate the cooking of a meal of pasta, noodles, rice, or such foods, either immediately or at a later time, and a means which will perform such cooking, including the steps of heating the water, mixing the water and foods, cooking the foods, draining the foods, and maintaining the cooked foods in a warm and moist environment.

It is the further object of the invention to provide a faster, more convenient, and less tedious process for cooking such foods than previously realized.

A more comprehensive appreciation of the invention will be realized in view of the included description and appended drawings, of which the following is a brief summary.

DESCRIPTION OF THE PREFERRED EMBODIMENT OF THE INVENTION

A preferred embodiment of the invention is depicted in FIGS. 1A through 1J.

Figure 1A:
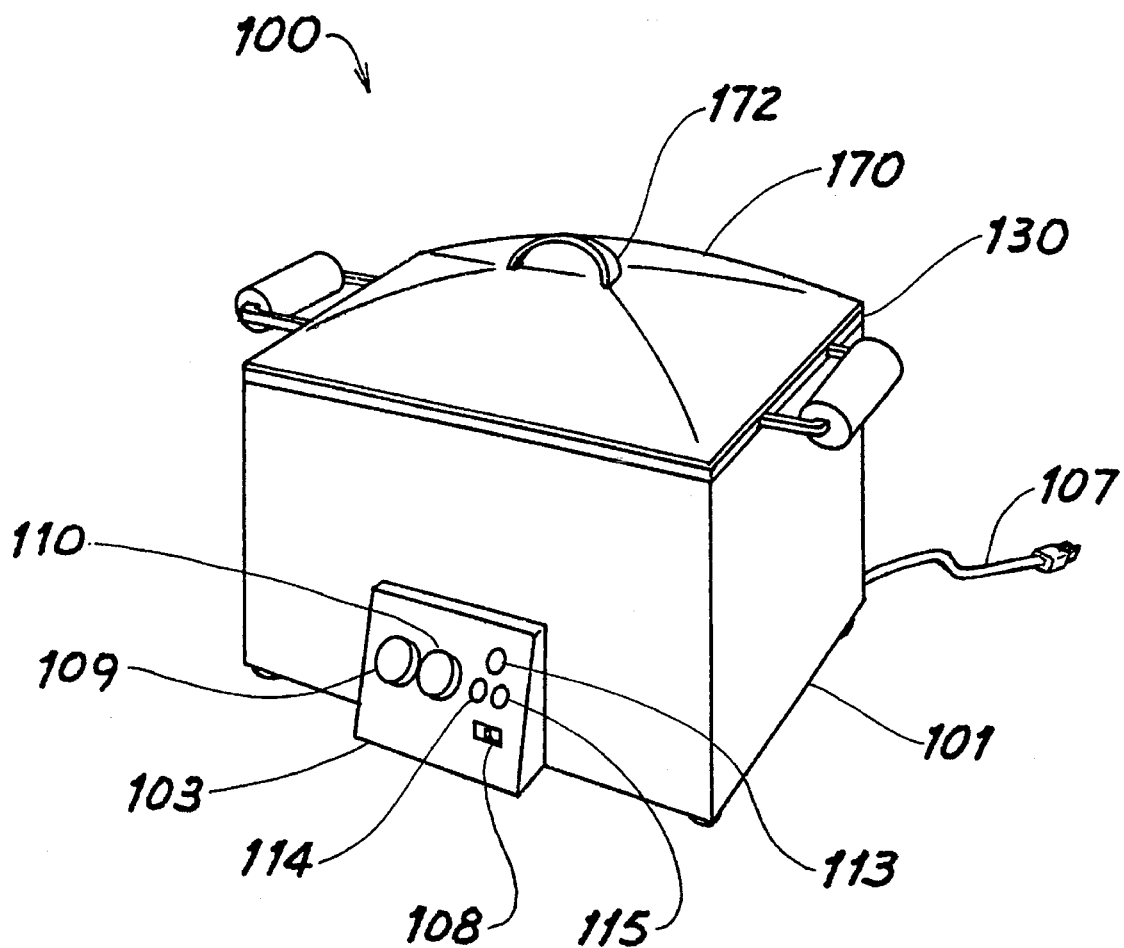
FIG. 1A is a perspective view of a pasta cooker in accordance with the invention.
Figure 1B:
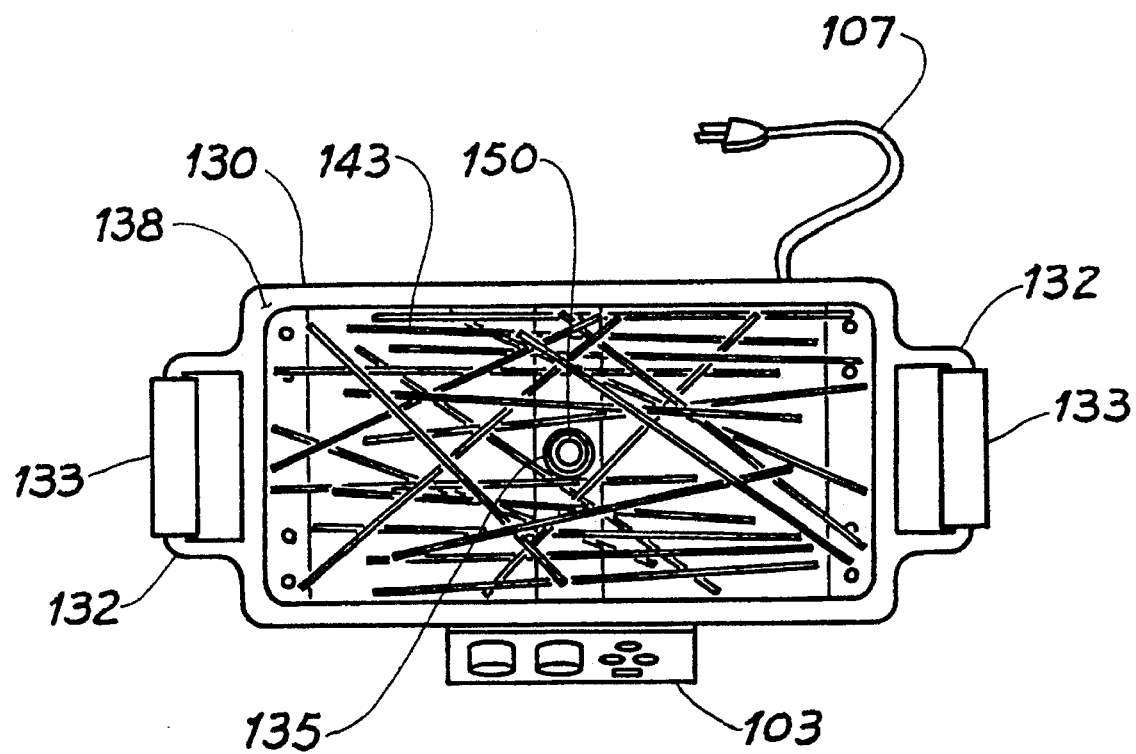
FIG. 1B is a top view of the device of FIG. 1A with the lid removed.
Figure 1C:
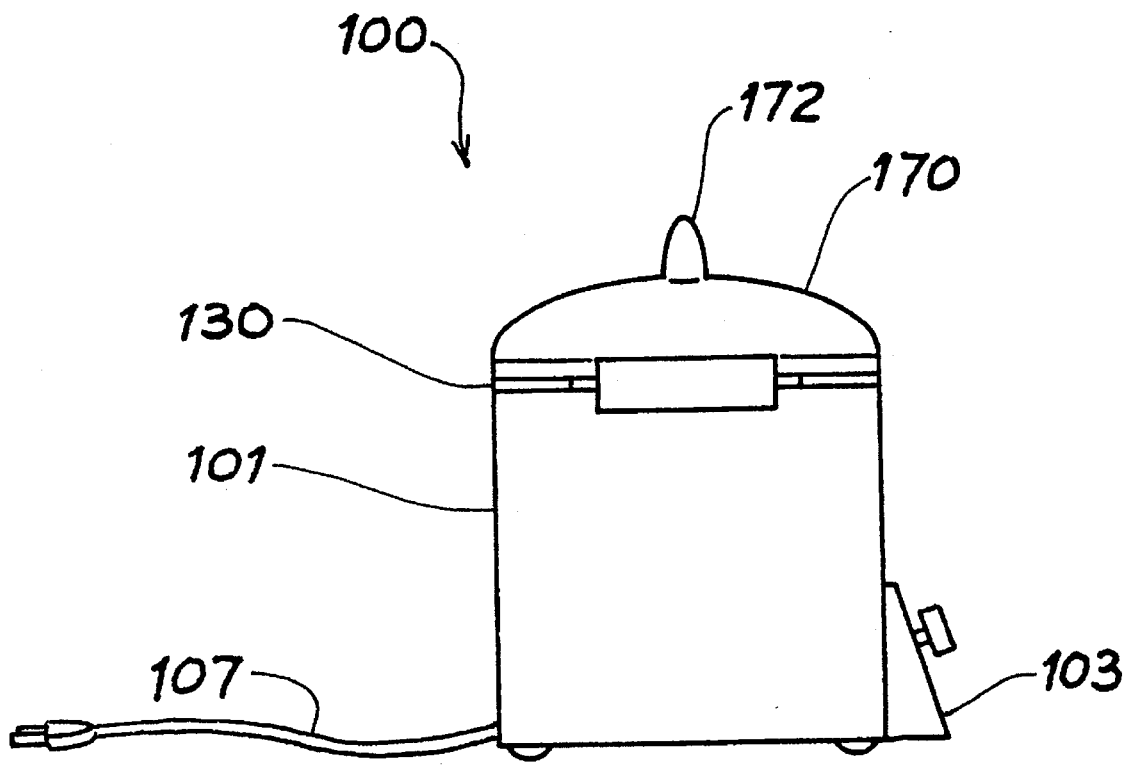
FIG. 1C is a left-side view of the device of FIG. 1A.

Referring to FIGS. 1A and 1C, the cooker 100 has a rectangular shape, derived from the long thin shape of spaghetti, which it is regularly intended to cook. Referring now also to the exploded view provided in FIG. 1E, the cooker comprises a base unit 101, a food compartment 130, a conduit 150, and a lid 170.

The base unit includes a main housing 102, a cooking control system 103, and a water container 104.

Figure 1D:
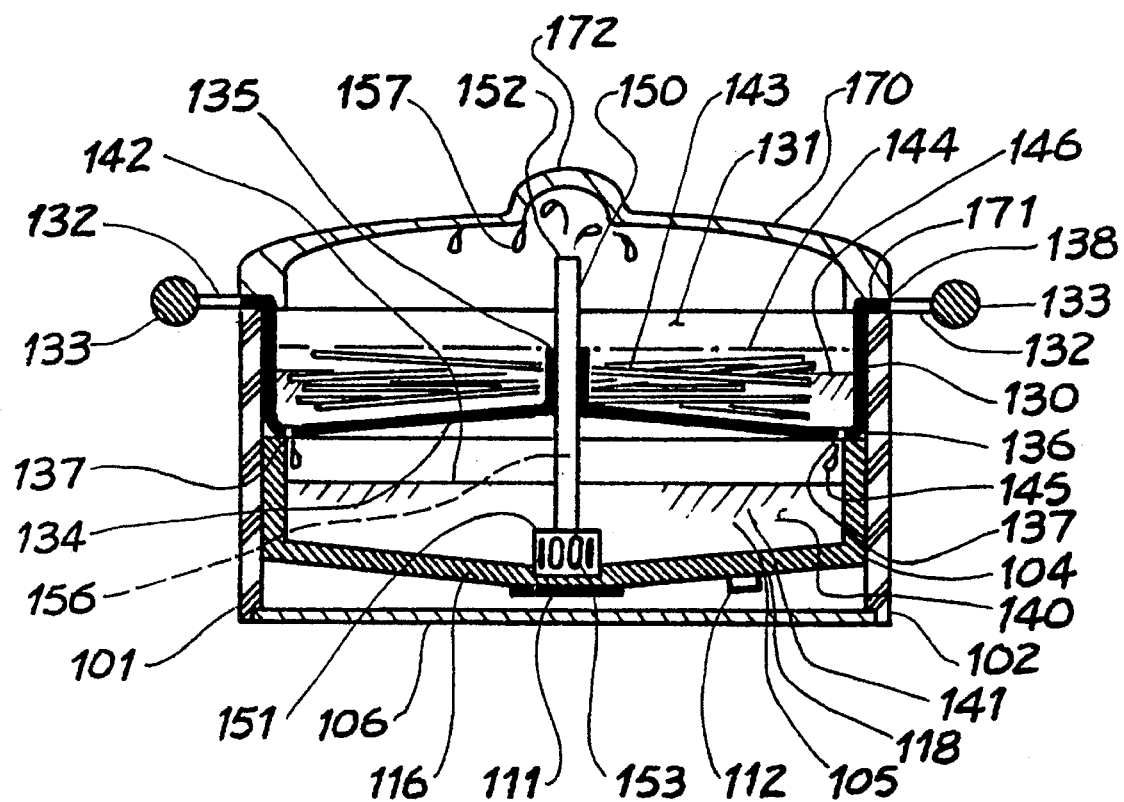
FIG. 1D is a cross-sectional front view of the device of FIG. 1A during cooking.
Figure 1E:
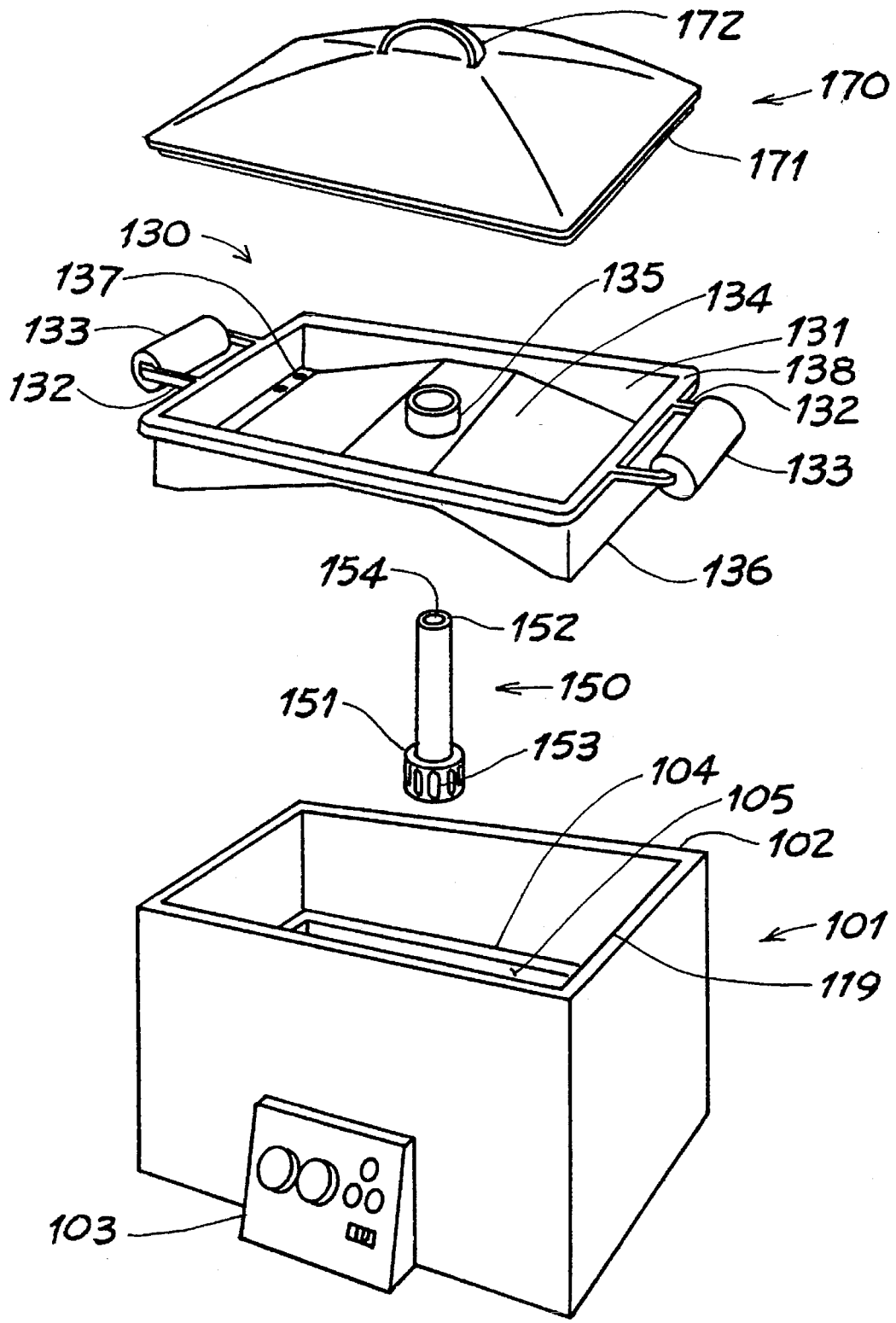
FIG. 1E is an exploded perspective view of the device of FIG. 1A.
Figure 1F:
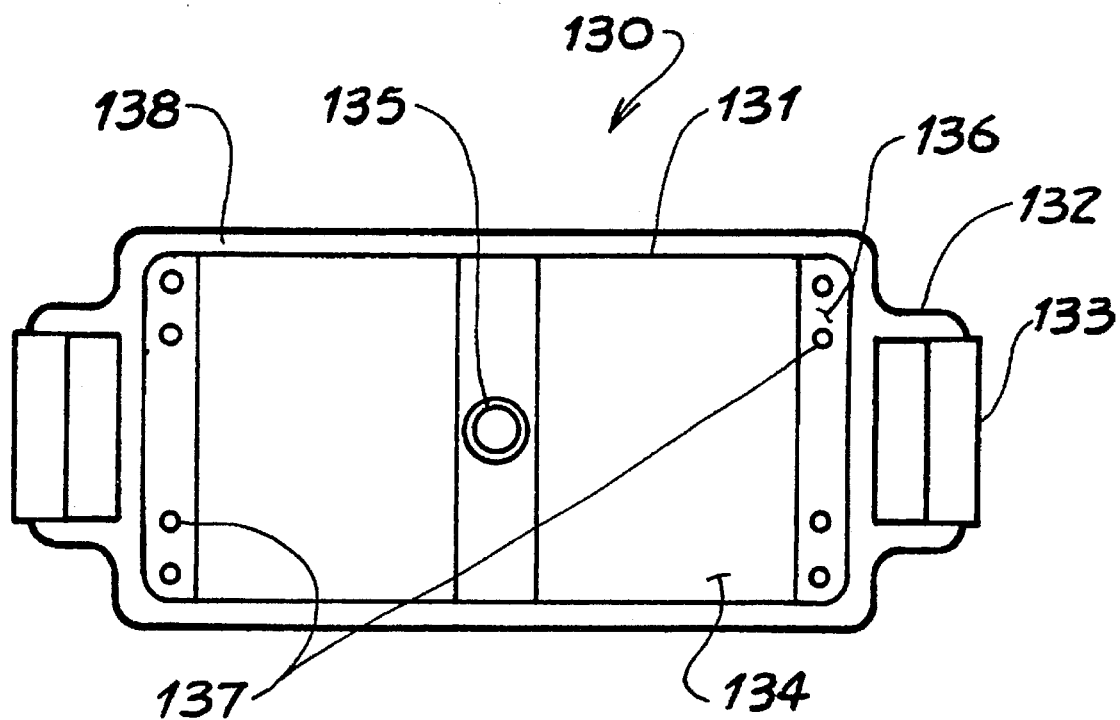
FIG. 1F is a top view of the food compartment of the device of FIG. 1A.
Figure 1G:
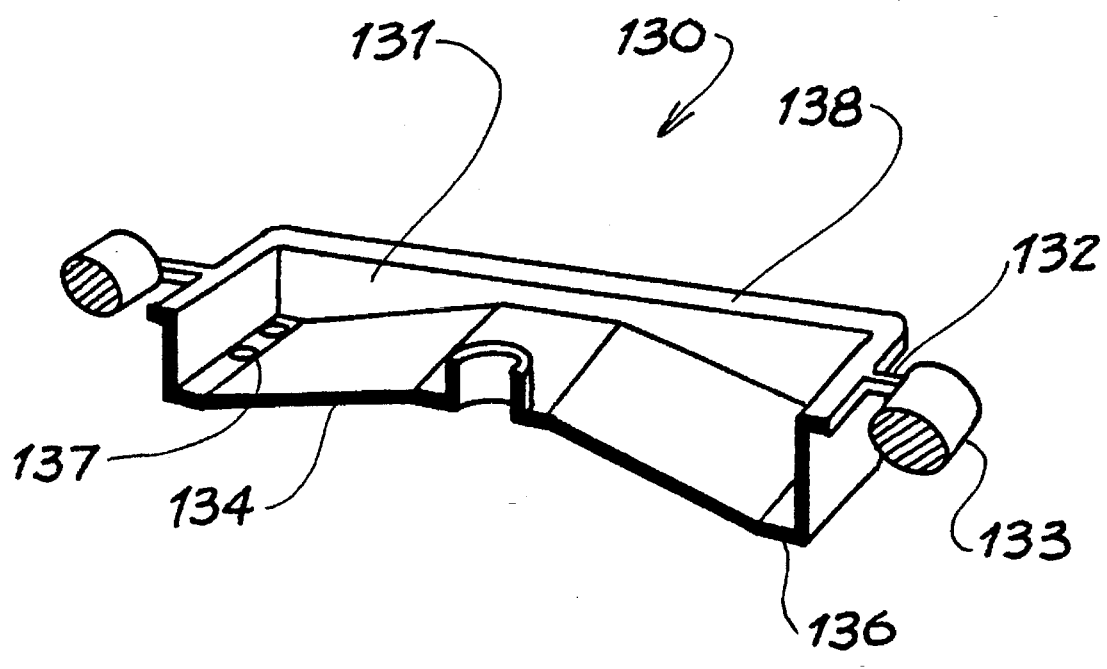
FIG. 1G is a cross-sectional perspective view of the food compartment of the device of FIG. 1A.
Figure 1H:
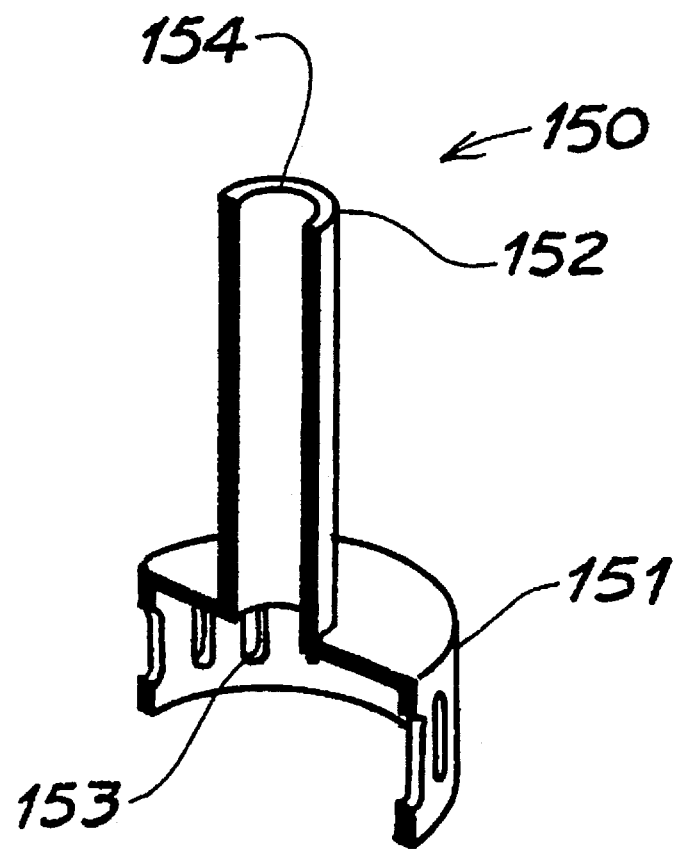
FIG. 1H is a cross-sectional perspective view of the conduit of the device of FIG. 1A.
Figure 1J:
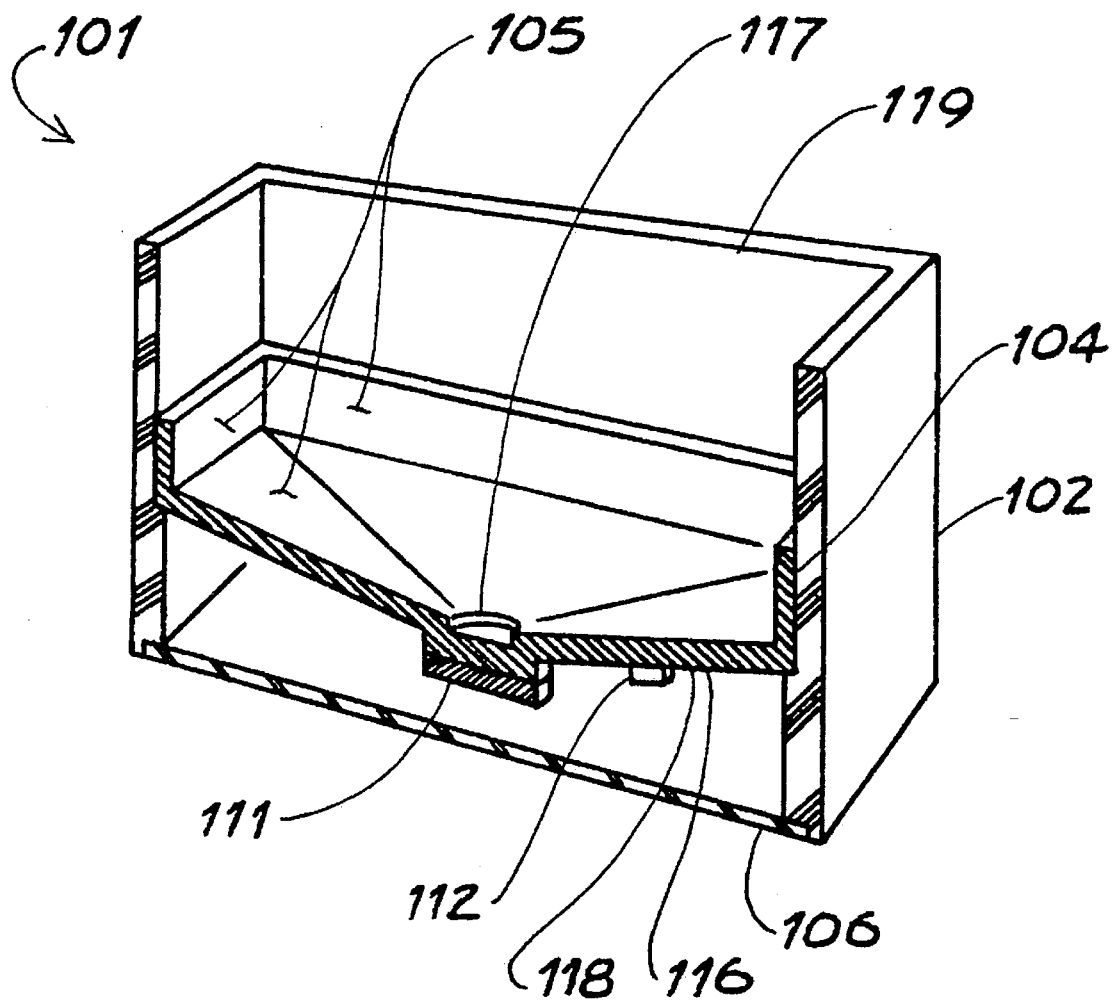
FIG. 1J is a cross-sectional perspective view of the base unit of the device of FIG. 1A.

The water container is more clearly seen by reference to FIGS. 1D and 1J. It is comprised of a heat conductive material such as stainless steel or aluminum. When aluminum is used, an anodized or teflon coating on the inside surfaces 105 will resist water corrosion and simplify cleaning. The bottom surface 116 of the water container is sloped downwardly towards its center, where a circular depression 117 is disposed therein. The circular depression is adapted to accept the conduit 150. The water container has an internal volume of approximately one liter.

The main housing is made of an electrically and thermally non-conductive material which is capable of withstanding the high temperatures of cooking. A heat tolerant plastic such as polypropylene or a ceramic material are preferred. The main housing fixedly engages the water container around all sides, leaving the top 119 open. The main housing and water container thereby form a larger compartment with the main housing further adapted to accept the food compartment into that larger compartment at the open top.

The main housing further includes a bottom cover 106 to guard against the accidental touching of the electrically live and/or hot internal components.

The cooking control system is protected within the main housing between the water compartment and the bottom cover, and includes a power cord 107, a power switch 108, a twenty-four hour timer 109, a cooking level selector 110, a heating element 111 (shown schematically), a temperature sensor 112 (shown schematically), a "power" lamp 113, a "cooking" lamp 114, and a "ready" lamp 115. The heating element is attached in thermal communication to, but electrical isolation from the underside 118 of the bottom surface 116 directly below and proximate to the circular depression 117. The temperature sensor is also attached to the underside of the bottom surface, near to the heating element.

With the power cord 107 attached to an electrical supply and the power switch 108 closed, the "power" lamp 113 will light and the twenty-four hour timer 109 can be selectively set to energize the heating element immediately or at a later time within twenty-four hours. The cooking level selector 110 may be adjusted for a higher or lower level of cooking, for instance from "soft" to "firm". The cooking control selector cooperates with the temperature sensor to de-energize the heating element when a water container temperature at the temperature sensor is realized which exceeds the level that is predetermined according to the cooking control selection. Alternatively, the cooking system could employ a simple count-down timer with adjustment of the count-down time providing variation of the amount of heating time to serve the same ultimate function.

At the selected turn-on time, the heating element 111 will begin to provide heat and the "cooking" lamp 114 will light, until the temperature sensor 112 realizes a temperature above the predetermined level. Then the heating element is de-energized, the "cooking" lamp is extinguished, and the "ready" lamp 115 lights.

The heating element 111 may be of many common types, but preferably of the resistive type for economy in manufacturing. A tubular sheathed element such as those used in many coffee brewers would be preferred. If a positive thermal coefficient (ptc) type element were instead employed, it's self temperature regulating capabilities could be used to react to the increase in the water container temperature and the temperature sensor 112 could be eliminated. But at the present time, the expense of such ptc elements may be prohibitive in comparison to the expense of a resistive element and temperature sensor.

The food compartment 130, which is individually illustrated in FIGS. 1F and 1G, includes basket portion 131 and two handles 132. Since the handles may otherwise become hot during use, they are equipped with thermally insulative grips 133, which are preferably made of a high temperature tolerant plastic such as polypropylene.

The basket portion is made of stamped stainless steel sheet metal and has a generally rectangular shape, at least eleven inches long within, four inches wide within, and two inches deep within, thereby having a volume of approximately one and one-half liters to hold the ten inch long cooked spagetti from a typical one pound box and the one liter of cooking water needed. Alternatively, the basket could be made of aluminum or a high temperature tolerant plastic and cold be round with an inside diameter of at least ten and one half inches and an appropriate depth, provided the remainder of the cooker was adapted accordingly. Less preferably, spagetti could be broken into shorter lengths if a smaller basket was employed. The top of the basket includes a peripheral flange 138 which engages the top opening 119 of the main housing 102. The mating of the underside of the flange and the top of the top opening is relatively precise to provide a reasonable seal therebetween. Alternatively, a silicone gasket could be disposed therebetween.

The basket portion 131 has a bottom surface 134 with an upwardly projecting tubular orifice 135 in the center thereof. The tubular orifice is adapted to accept the conduit 150. The bottom surface slopes slightly downwardly away from the tubular orifice. Just inboard of its perimeter 136, the bottom surface includes a series of drain holes 137. The drain holes are thereby through the bottom surface at its lowest point. Extending from the ends of the basket are the handles 132, which provide for convenient carrying of the basket from the cooker, with or without the lid 170 thereon.

The conduit 150, which is individually illustrated in cross-section in FIG. 1H, is a stainless steel tube, expanded to a larger diameter at it's base 151 than at its top 152. The tube could alternatively be of aluminum or a high temperature tolerant plastic. The tube base is sized and shaped to fit within and mate with the circular depression 117 of the water container, and includes a series of peripheral water inlet openings 153 therearound. The top of the conduit is sized and shaped to fit through the tubular orifice 135 of the food compartment 130 so that its top opening 154 results at least two inches above the bottom surface 134 after assembly.

The lid 170 fits over and within the basket portion 131 of the food compartment 130. It is preferably made of glass to allow viewing of cooking therethrough, but stainless steel or such is a reasonable substitute. The lid is rectangular and dome shaped, sloping downwardly towards its perimeter 171, which is adapted to sit sealingly on and within the basket portion. The weight of the lid is approximately two pounds and it's length and width are twelve and five inches respectively. The lid further includes a small handle 172 at it's peak for convenient removal from the cooker.

The following explanation of assembly and use are best understood by reference to FIGS. 1B, 1D, and 1E.

When properly assembled within the cooker, the conduit 150 stands vertically within the center of the water container 104, and the food compartment 130 is fitted into the top of the main housing and accepts the upwardly projecting conduit at its center. The lid 170 is fitted over and within the food compartment and is reasonably sealed so that an internal cooking chamber 140 is formed therein.

To prepare for use, the water chamber is filled with water 141 to water level 142. The conduit is positioned within the water container with the inlet openings 153 below the water level. The food compartment is fitted onto the conduit and main housing, and loaded with pasta 143. When spread evenly in the basket portion, the recommended amount of uncooked pasta, one pound for this device, has a top level 144 which is approximately three-quarters of an inch high within the basket. The pasta will swell during cooking and water will enter the food compartment so that the level is potentially as high as two inches. The conduit top opening 154 is thereby disposed at that maximum two inch height. The lid is positioned over the basket portion to complete the assembly and the control system 103 can now be activated.

To initiate cooking, the power switch 108 is closed and the timer 109 is set. At the turn-on time, the heating element 111 begins to transfer heat to the water 141 in the vicinity of the conduit base 151. This heating causes localized boiling within the conduit and a percolation of the heated water 156 within the conduit to rise up through the conduit and spray out of the top opening 154. The rising water has a certain upward flow rate. The spraying water 157 showers the pasta 143 and collects within the food compartment. A portion of that water will drain back to the water container during cooking. The size and number of drainage holes 137 are selected to allow flow of that drainage water 145 at a rate slower than the upward flow rate, so that the hot water will accumulate within the food compartment and immerse the pasta as cooking water 146. The holes must also be small enough to deny the pasta from falling therethrough. The food compartment has sufficient volume to contain all of the water and pasta, so does not overflow. Alternatively, if a larger water container capacity was employed, an overflow hole could be provided in the basket portion at an allowable level to prevent leakage of water out of the cooker from the basket by allowing the water to overflow back to the water container when it exceeded that allowable level.

The heating within the enclosed cooking chamber 140 will create a positive pressure therein which slightly increases water boiling temperature, and accelerates and improves the evenness of the cooking by improving heat penetration into the food. The pressure is regulated by the sealing of the lid 170, basket flange 138, and main housing top surface 119. The weight and area of the lid maintain the chamber pressure below one-thirtieth of one pound per square inch.

During the cooking cycle, heat is continuously transferred to the water 141, heated water 156 continuously percolates up through the conduit to the food compartment where it showers over the pasta, collects therein and cooks the pasta 143, draining water 145 is continuously reheated and repercolated. The showering of the pasta by the hot water and the slight positive cooking pressure are found to provide a very fast cooking time and improved cooking quality.

After some time of continuously rising water temperature, the water container bottom surface 116 reaches a level, predetermined to indicate the pasta is sufficiently cooked, and which activates the temperature sensor 112 and causes the control system to terminate heating. Alternatively, the temperature sensor may be adapted to sense that the bottom surface temperature has risen above one hundred degrees Celsius, indicating a lack of water remaining in the water container, and terminate heating then. Once heating has been terminated, the percolation will cease, but drainage will continue until all cooking water has drained from the food compartment.

The residual heat and humidity within the cooking compartment will maintain the cooked pasta in an ideal environment for some time, without further cooking. Alternatively, a reduced heat could be continuously or cyclically provided to maintain such an environment indefinitely.

The cooked pasta may be served directly from the cooker, or the food compartment may be carried from the cooker for serving. The lid may remain on the food compartment as it is transported if desired, to help in keeping the pasta warm and moist.

Cleaning of the cooker is accomplished by washing the lid, food compartment, and conduit in a sink or dishwasher. The main housing may be cleaned by partial filling with soapy water, sponging within, pouring the soapy water from to main housing while being careful not to wet the controls, and rinsing with similar caution. The outer surfaces may be wiped with a damp sponge.

Another embodiment of the invention is depicted in FIGS. 2A through 2H.

Referring to FIGS. 2A through 2D, the cooker 200 has a rectangular shape, somewhat longer than the first embodiment. Referring now also to the exploded view provided in FIG. 2F, the cooker comprises a base unit 201, a food compartment 230, a waste water container 250, and a cap 270.

The base unit includes a main housing 202, a cooking control system 203, and a supply water container 204.

Figure 2A:
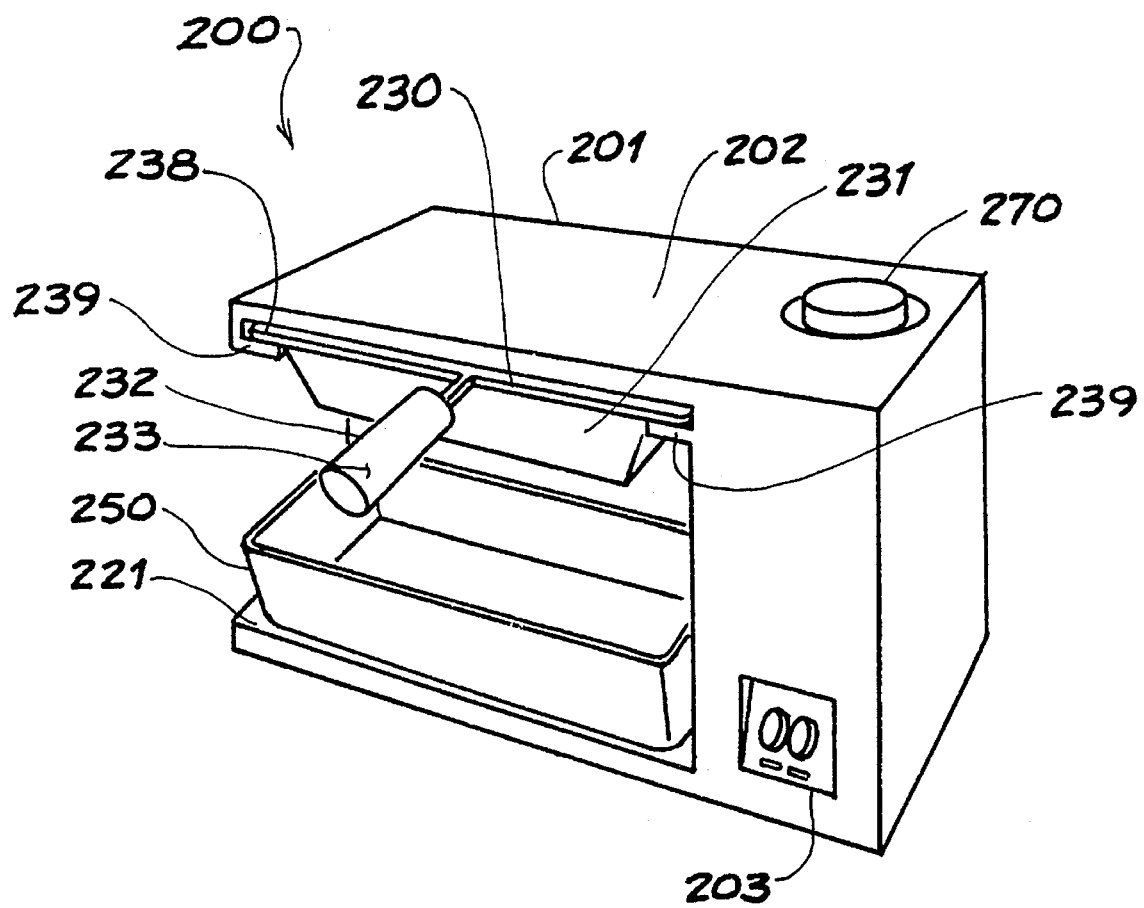
FIG. 2A is a perspective view of another pasta cooker in accordance with the invention.
Figure 2B:
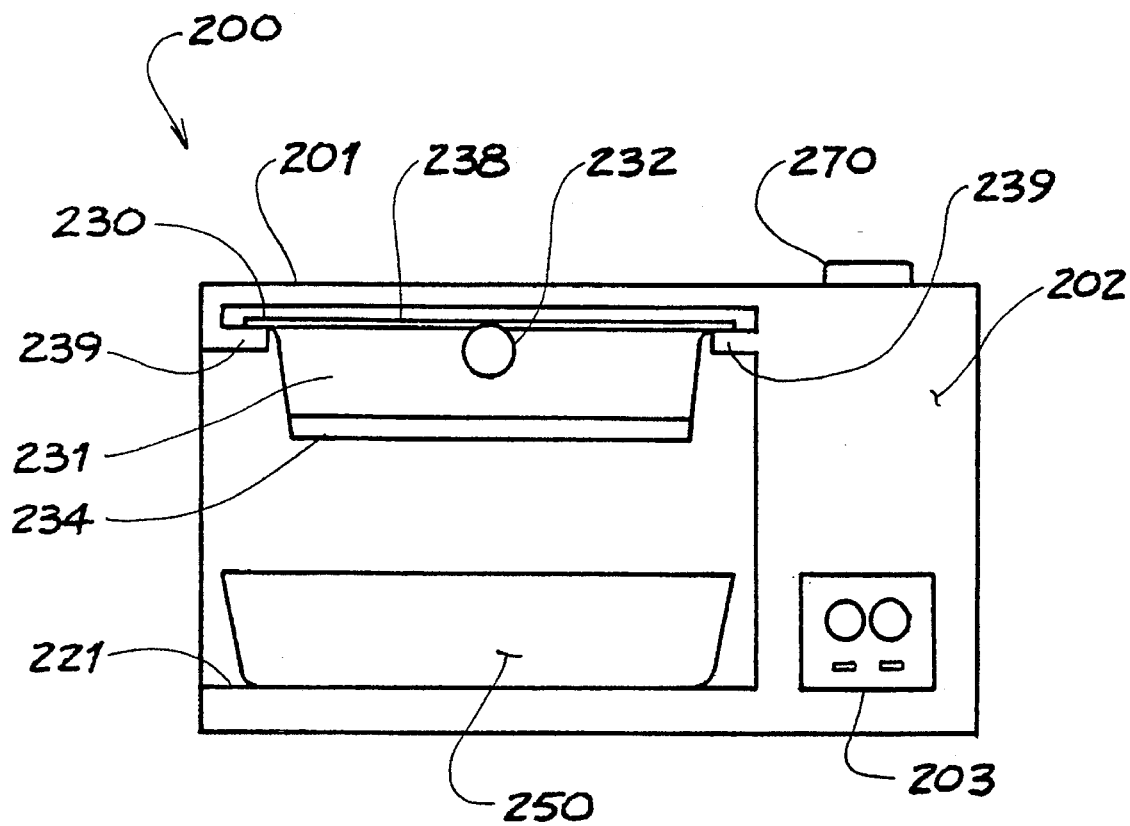
FIG. 2B is a from view of another pasta cooker in accordance with the invention.
Figure 2C:
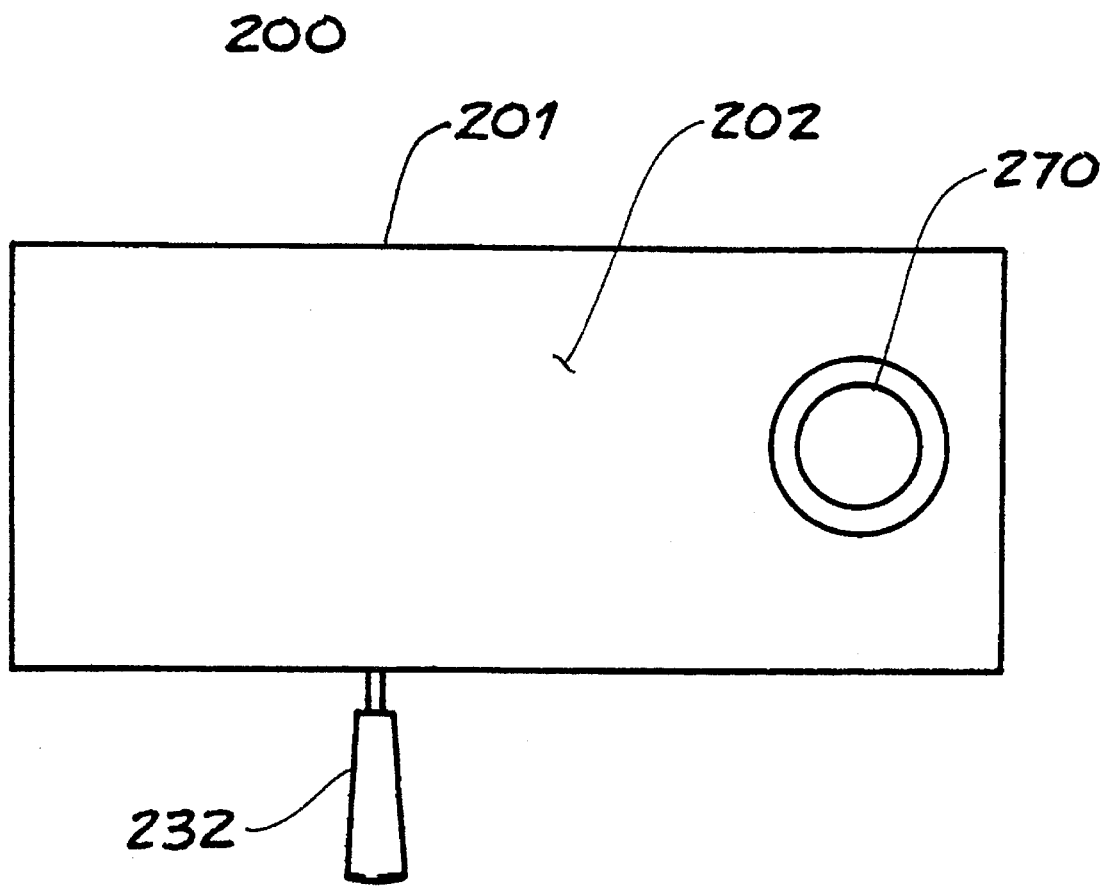
FIG. 2C is a top view of the device of FIG. 2A.
Figure 2D:
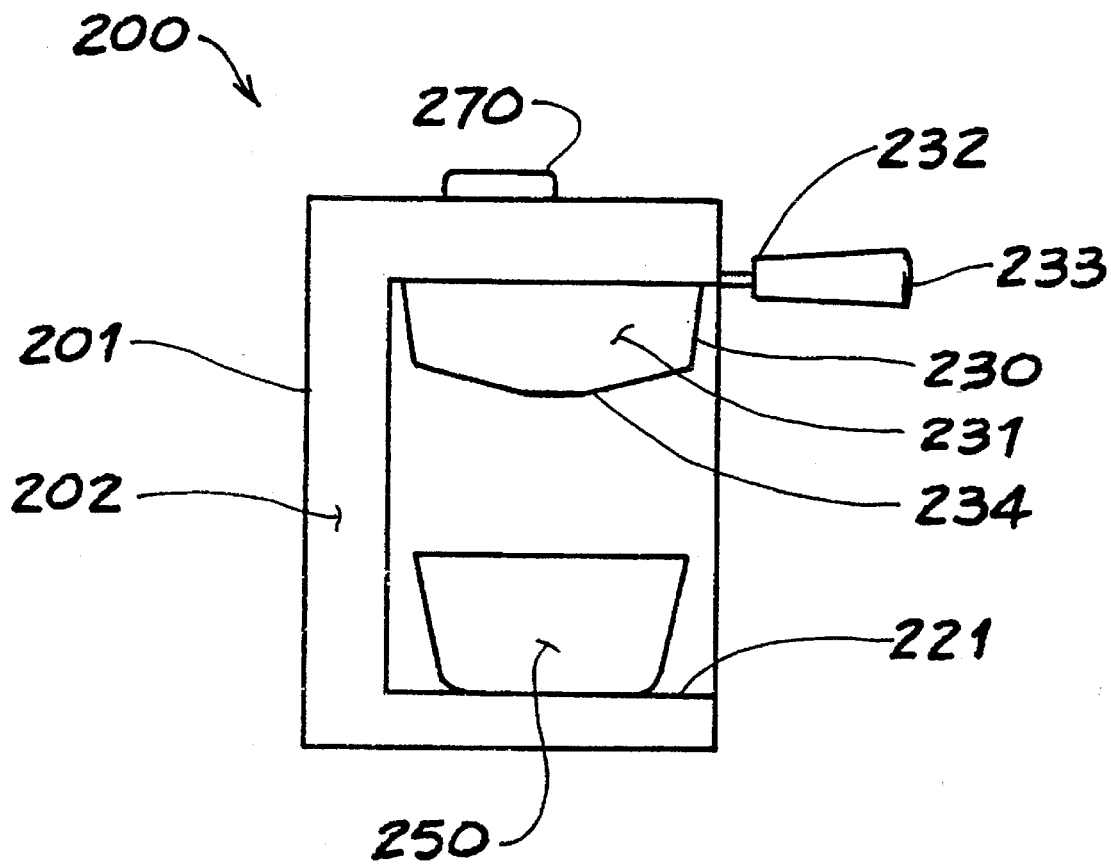
FIG. 2D is a left-side view of the device of FIG. 2A.
Figure 2E:
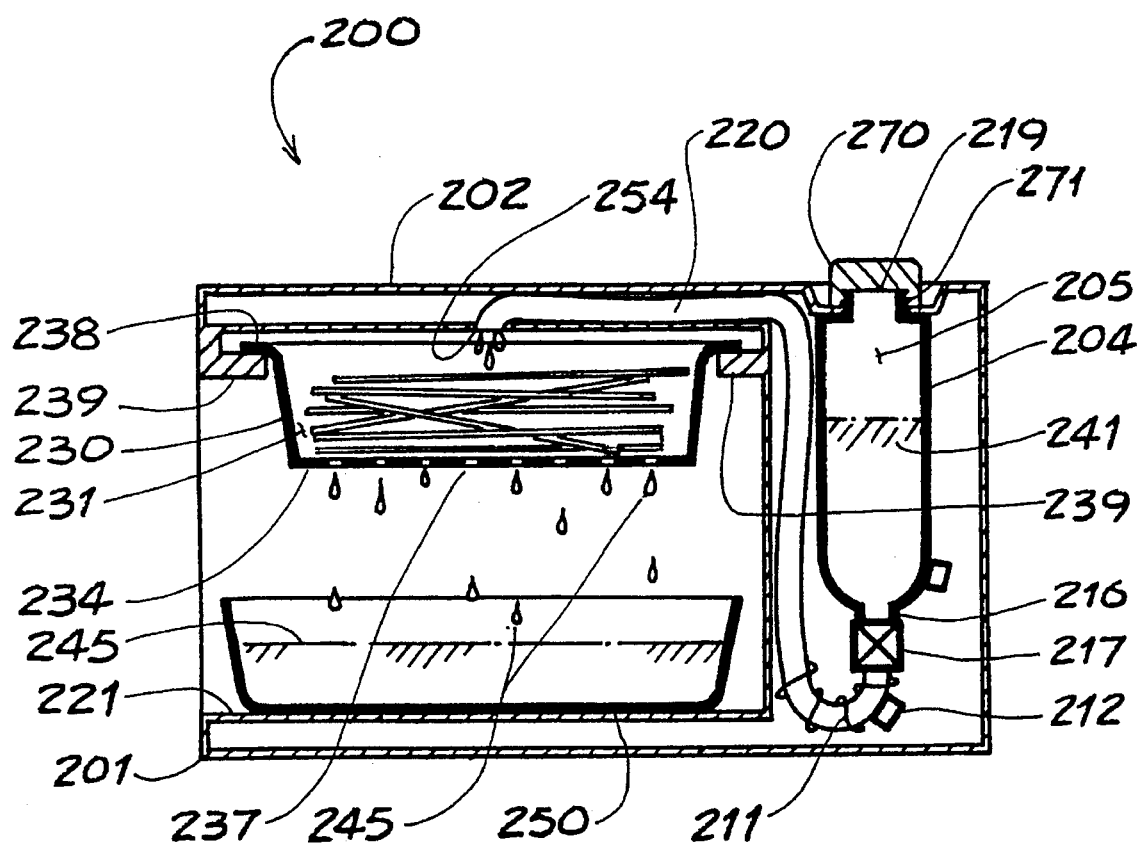
FIG. 2E is a cross-sectional front view of the device of FIG. 2A during cooking.
Figure 2F:
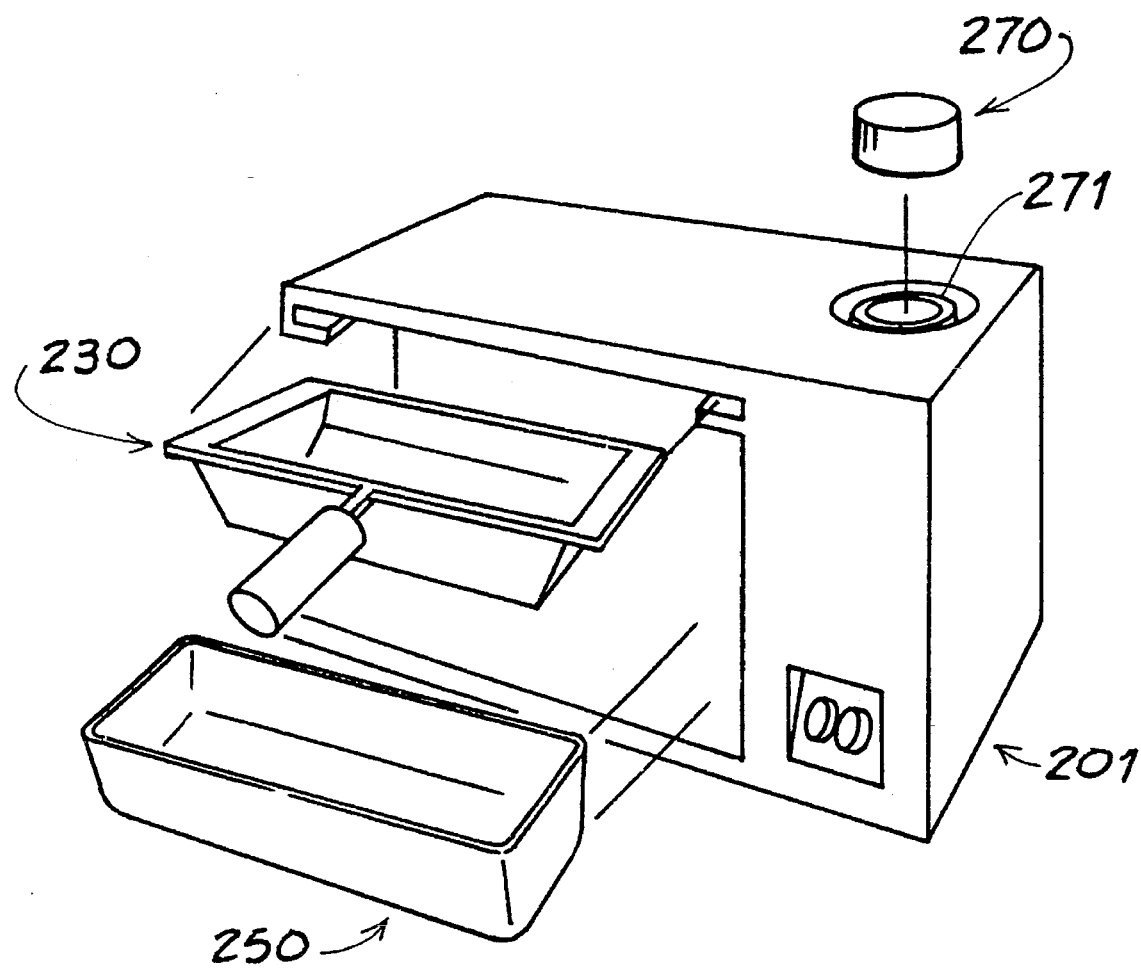
FIG. 2F is an exploded view of the device of FIG. 2A.
Figure 2G:
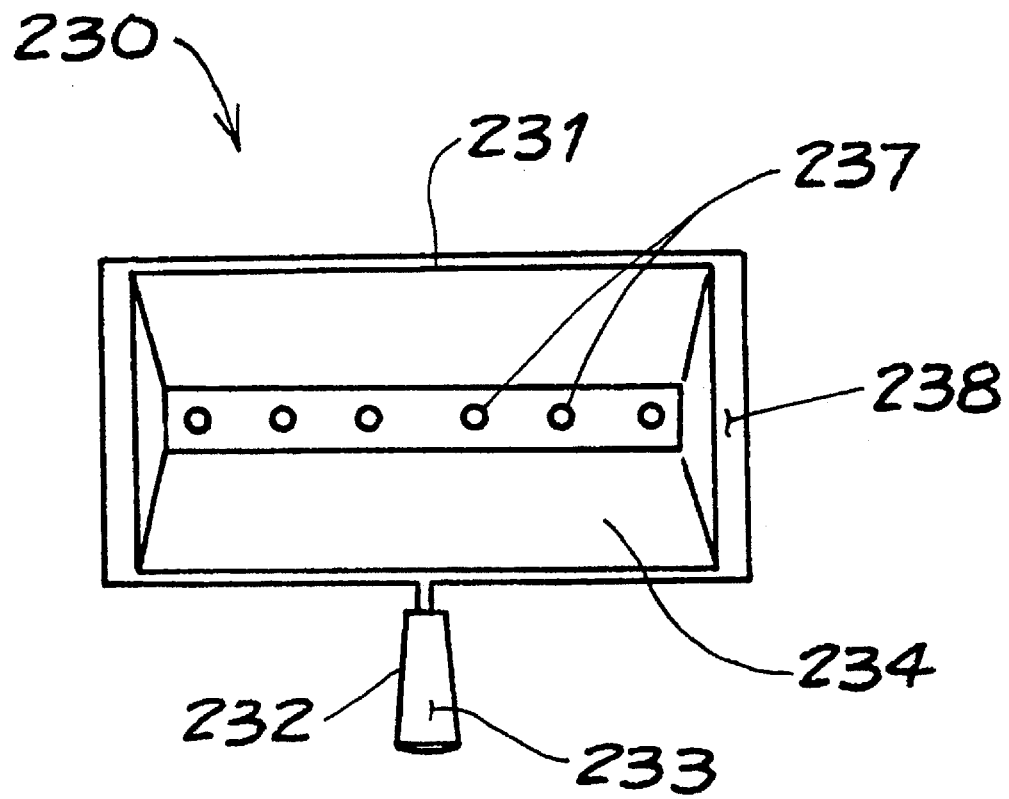
FIG. 2G is a top view of the food compartment of the device of FIG. 2A.
Figure 2H:
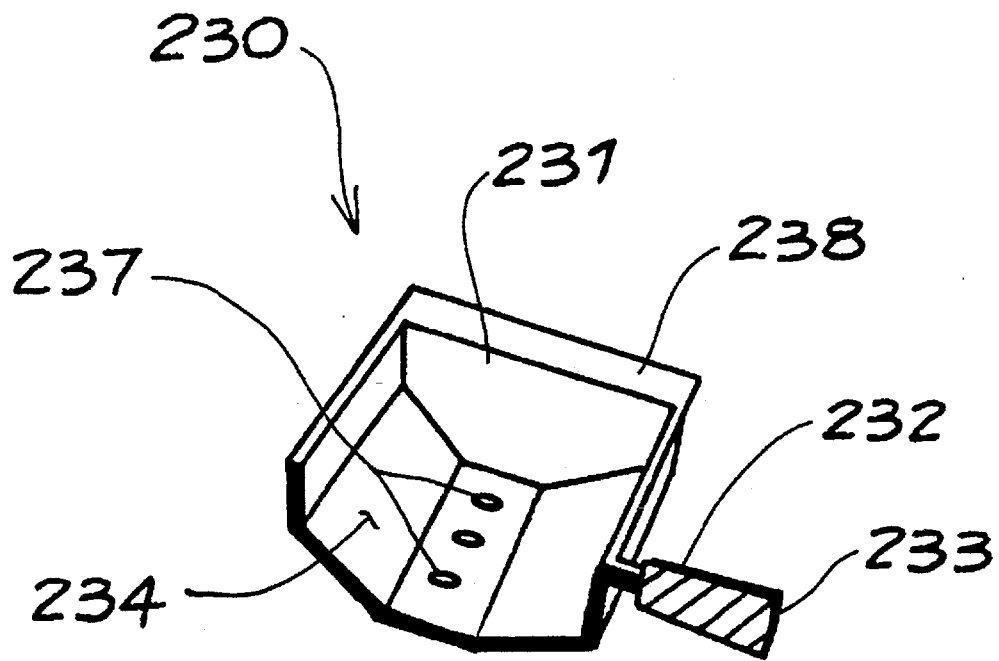
FIG. 2H is a cross-sectional perspective view of the food compartment of the device of FIG. 2A.

The supply water container is more clearly seen by reference to FIG. 2E. It is comprised of a material such as plastic, stainless steel or aluminum. When aluminum is used, an anodized or teflon coating on the inside surfaces 205 will resist water corrosion and simplify cleaning. The bottom 216 of the water container is sloped downwardly towards its center, where it is attached to a simple one-way valve 217 (shown schematically) adapted to limit water flow therethrough to only downward and out from the container. The one-way valve is adapted to engage tubular conduit 220 which thereby provides a fluid path from the supply water container 204 through the one-way valve 217, through the conduit, and out from the outlet 254 of the conduit above the food compartment 230. The supply water container has an internal volume of approximately two liters.

The main housing is made of molded plastic. A heat tolerant plastic such as polypropylene is preferred due to the proximity to heat during cooking. The main housing encloses the supply water container, leaving the container top 219 open. The main housing is adapted with engagement shelves 239 to accept the food compartment 230 under the conduit outlet 254 and horizontal surface 221 to accept the wastewater container 250 under the food compartment.

The cooking control system is protected within the main housing and includes equivalent features and components as the first embodiment. The heating element 211 (shown schematically) of this device surrounds a portion of the conduit. The temperature sensor 212 (shown schematically) is attached to the lower outside of the supply water container.

The sequence of operation and electrical functions of this device is also very similar to the first embodiment, except that temperature sensor reacts to the rise in temperature of the conduit to above one hundred degrees Celsius as water is depleted from the supply water container. The cooking control selector then de-energizes the heating element.

At the selected turn-on time, the heating element 211 will begin to provide heat until the temperature sensor 212 reacts to open the heating circuit and the heating element is de-energized.

The food compartment 230 includes basket portion 231 and handle 232. Since the basket will often be hot during use, the handle is equipped with thermally insulative grip 233, which is preferably made of a high temperature tolerant plastic such as polypropylene.

The basket portion is made of stamped stainless steel sheet metal and has a generally rectangular shape, at least eleven inches long within, four inches wide within, and four inches deep within, thereby having a volume of almost three liters to hold the ten inch long cooked spagetti from a typical one pound box, and the two liters of supply water. Alternatively, the basket could be made of aluminum or a high temperature tolerant plastic. Less preferably, the spagetti could be broken into shorter lengths if a smaller basket was employed. The top of the basket includes a peripheral flange 238 which slide into engagement shelves 239 of the main housing 202.

The basket portion 231 has a bottom surface 234 which slopes slightly downwardly towards its center and includes a series of drain holes 237. The drain holes are thereby through the bottom surface at its lowest point. Extending out from the front of the basket is the handle 232, which provides for convenient carrying of the basket from the cooker.

The conduit 220 is a aluminum tubing, adapted to engage the heating element in a manner that allow efficient transfer of heat to the water within.

The cap 270 fits over and threadedly engages threaded neck 271 to enclose the supply water container.

To prepare for use, cap is removed and the supply water chamber is filled with two liters of supply water 241, then the cap is replaced. Water flows from the supply water container into the conduit to partially fill the conduit and partially empty the container until an equal water level exists in each. The food compartment is loaded with pasta 243 and fitted fully into the engagement shelves of the main housing. The conduit outlet 254 is thereby disposed directly above the pasta. The empty waste water container 250 is positioned onto horizontal surface 221 and directly below the food container and drainage holes to complete the assembly and the control system 203 can now be activated.

At the turn-on time, the heating element 211 begins to transfer heat to the water in the conduit. This heating causes boiling within the conduit and a percolation of the heated water 256. The percolating water cannot rise back into the supply water container due to the one-way valve 217, so is forced to escape through the conduit outlet 254 at a certain upward flow rate and thereby shower over, immerse, cook, and drain through the pasta 243 within the food compartment. After draining through the pasta, the waste water 245 drains through the drain holes 237 to collect in the waste water container 250. The size and number of drain holes 237 are selected to allow drainage of that waste water at a slower rate than the upward flow rate, so that the hot water will accumulate temporarily within the food compartment during cooking. The food compartment has sufficient volume to contain all of the cooked pasta, which swells as it absorbs water during cooking, and all of the water. Alternatively, the drain holes could be adapted to increase the drainage rate and prevent accumulation of water in the food compartment, but the cooking would require more water to provide a longer hot showering period.

The temperature sensor is adapted to sense that the conduit temperature has risen above one hundred degrees Celsius, indicating a lack of water remaining in the supply water container, and terminate heating then. Once heating has been terminated, the percolation will cease, but drainage will continue until all water has drained from the food compartment into the waste water container.

The cooked pasta may be served directly from the food compartment, which may be carried from the cooker.

Cleaning of the cooker is accomplished by washing the cap, food compartment, and waste water container in a sink or dishwasher. The supply water container may be cleaned by partial filling with hot water, brushing with a bottle brush or such, then pouring the hot water out while being careful not to wet the controls, then rinsing with similar caution. The outer surfaces may be wiped with a damp sponge.

Figure 3:
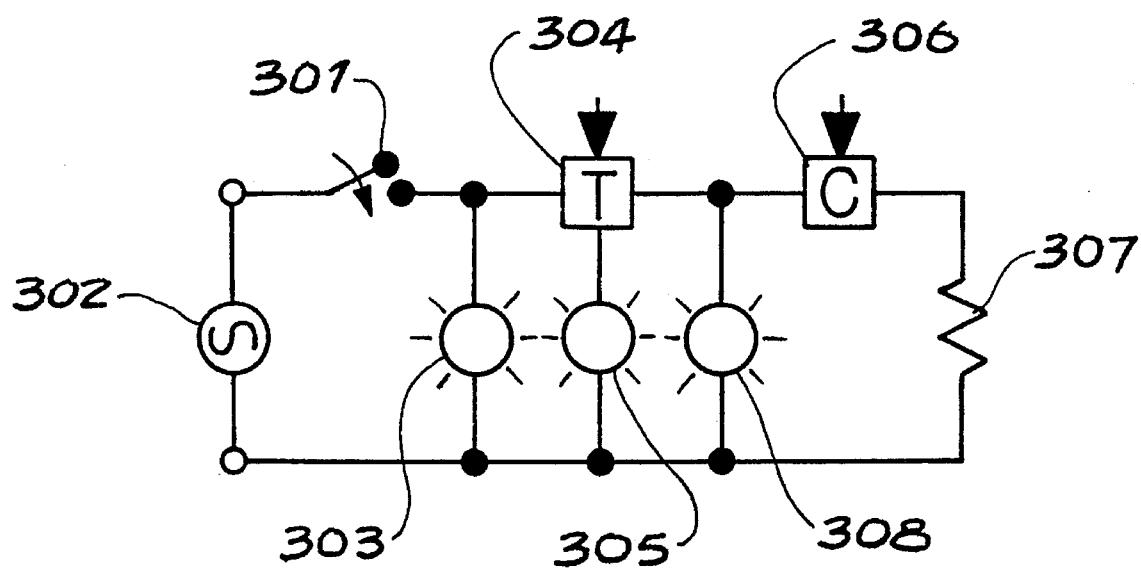
FIG. 3 is a schematic representation of a typical electrical circuit for a device in accordance with the invention.

A typical electrical circuit for the device is depicted schematically in FIG. 3. Power switch 301 closes the circuit to allow supply voltage 302 to light "power" lamp 303 and to energize twenty-four hour timer 304. The timer is adjustable for selecting a turn-on time or immediate cooking. When cooking begins, "cooking" lamp 305 lights and cooking controller 306 is closed to allow energization of heating element 307. Cooking controller 306 may be a simple temperature sensor, an adjustable temperature sensor, or a count-down timer. The impedance through the cooking controller and heating element series is very low in comparison to that of "ready" lamp 308, so minimal current flows through the "ready" lamp and it does not light during cooking. When the cooking controller opens the circuit at the termination of cooking, the "ready" lamp lights and the timer 304 extinguishes the "cooking" lamp.

Those skilled in the art will recognize that there are many variations of the invention that are within the scope of the invention, therefore, the invention herein claimed is to be defined only by the limitations and the equivalents thereof which the following sets forth.

I claim:

1. An electrical pasta cooking device comprising;

an electrical heater, a first compartment for containing water in thermal communication with said electrical heater, and having a lower water level and a first upper water level, a second compartment for containing pasta, having a cooking level and having a bottom surface disposed below said cooking level and above said first upper water level, said bottom surface including one or more drainage holes therethrough, said one or more drainage holes adapted to allow a down-flow of water therethrough, a conduit for providing fluid communication from said first compartment at said lower water level to said second compartment above said cooking level, a third compartment for containing water and having a second upper water level disposed below said bottom surface, and adapted for receiving water from said drainage holes, a control to establish a cooking period, and to energize said heater during said cooking period and to reduce energization of said heater after said cooking period, and wherein water within said first compartment is heated by said energized heater during said cooking period, said heated water up-flows by percolation from said first compartment, through said conduit and into said second compartment above said cooking level, cooks pasta within said second compartment, and down flows through said drainage holes to said third compartment after said cooking period to drain said pasta.

2. The device of claim 1 wherein said second compartment is separable therefrom.

3. The device of claim 2 wherein said control includes an adjustable delay timer to allow a selectable delay before initiation of said cooking period.

4. The device of claim 2 wherein said third compartment is said second compartment.

5. The device of claim 4 further comprising a pressure regulating lid to cause and maintain positive pressure in said second compartment during said cooking period.

6. The device of claim 2 wherein said control includes a thermostatic control to sense water temperature and to reduce energization of said heater after said cooking period, when said water temperature reaches a predetermined temperature level.

7. The device of claim 6 wherein said thermostatic control is an adjustable thermostatic control to allow selection of said predetermined temperature level.

8. The device of claim 2 wherein said control includes a turn-down timer to reduce energization of said heater after a predetermined cooking period time has elapsed.

9. The device of claim 8 wherein said turn-down timer is an adjustable timer to allow selection of said predetermined cooking period time.

10. The device of claim 2 wherein said control includes an adjustable heater control to allow selection of heat output from said heater.

11. The device of claim 1 wherein;

said one or more drainage holes are adapted to allow said down-flow of water therethrough at a maximum down-flow rate, and said heated water up-flows by percolation from said first compartment, through said conduit and into said second compartment at an up-flow rate greater than said maximum down-flow rate, down-flows through said drainage holes at or below said maximum down-flow rate during said cooking period to facilitate collection of water within said second compartment at said cooking level, immerses and cooks pasta within said second compartment, and down flows through said drainage holes to said third compartment after said cooking period to drain said pasta.

12. An electrical pasta cooking device comprising;

an electrical heater, a first compartment for containing water in thermal communication with said electrical heater, and having a lower water level and a upper water level, a separable second compartment for containing pasta, having a cooking level and having a bottom surface disposed below said cooking level and above said upper water level, said bottom surface including one or more drainage holes therethrough, said one or more drainage holes adapted to allow a down-flow of water therethrough to said first compartment at a maximum down-flow rate, a conduit for providing fluid communication from said first compartment at said lower water level to said second compartment above said cooking level, a control to energize said heater during a cooking period, and including an adjustable delay timer to allow a selectable delay before initiation of said cooking period, and including a thermostatic control to sense water temperature and to reduce energization of said heater after said cooking period when said water temperature reaches a predetermined temperature level, a pressure regulating lid to cause and maintain positive pressure in said second compartment during said cooking period, and wherein water within said first compartment is heated by said energized heater during said cooking period, said heated water up-flows by percolation from said first compartment, through said conduit and into said second compartment at an up-flow rate greater than said maximum down-flow rate, down-flows through said drainage holes at or below said maximum down-flow rate and back into said first compartment during said cooking period to facilitate collection of water within said second compartment at said cooking level, immerses and cooks pasta within said second compartment, and said heated water down-flows through said drainage holes and back into said first compartment after said cooking period to drain said pasta.

13. The device of claim 12 wherein said thermostatic control is an adjustable thermostatic control to allow selection of said predetermined temperature level.

14. The device of claim 12 wherein said control further includes a turn-down timer to reduce energization of said heater after a predetermined cooking period time has elapsed.

15. The device of claim 14 wherein said turn-down timer is an adjustable timer to allow selection of said predetermined cooking period time.

16. The device of claim 12 wherein said control further includes an adjustable heater control to allow selection of heat output from said heater.

17. An electrical pasta cooking device comprising;

an electrical heater, a first compartment for containing supply water and having a lower water level and a first upper water level, a separable second compartment for containing pasta, having a cooking level and having a bottom surface disposed below said cooking level and above said first upper water level, said bottom surface including one or more drainage holes therethrough, said one or more drainage holes adapted to allow a down-flow of waste water therethrough, a conduit for providing flow of said supply water from said first compartment at said lower water level to said second compartment above said cooking level, a third compartment adapted for receiving said waste water from said drainage holes and for containing said waste water and having a second upper water level disposed below said bottom surface, a control to energize said heater during a cooking period, and including an adjustable delay timer to allow a selectable delay before initiation of said cooking period, and including a turn-off device to de-energize said heater after said cooking period, and wherein said supply water is heated by said energized heater during said cooking period and thereby percolates, said percolating supply water up-flows through said conduit and into said second compartment, cooks pasta within said second compartment and becomes said waste water, and said waste water down-flows through said drainage holes to said third compartment during and after said cooking period to drain said pasta.

* * * * *